3,313,759
PREPARATION OF CONCENTRATED LATICES
Gerardus E. La Heij and Jacques A. Waterman, Amsterdam, Netherlands, assignors to Shell Oil Company, New York, N.Y., a corporation of Delaware
No Drawing. Filed June 12, 1963, Ser. No. 287,208
Claims priority, application Netherlands, Oct. 3, 1962, 283,870
7 Claims. (Cl. 260—29.7)

This invention relates to processes for producing latices of synthetic elastomers. More particularly, it relates to improved processes for producing concentrated latices of synthetic elastomers from hydrocarbon solutions of the said synthetic elastomers.

The art and technology relating to latices of synthetic polymers is, of course, highly developed. In the prior art, synthetic elastomers are commonly prepared by emulsion polymerization techniques whereby the resulting product at the end of the polymerization is an emulsion wherein the solids content varies depending upon the particular art and technology involved. Thus, for example, synthetic elastomers of the type represented by styrene-butadiene copolymers are suitably prepared by emulsion polymerization in the presence of water and emulsifying agents so that the resulting product is an aqueous emulsion of the copolymer together with unreacted monomers. The copolymer may be ultimately separated upon the addition of salt and acid whereupon there results a crumb of the rubber which is then easily separated from the aqueous phase. Synthetic latex, as distinguished from crumb, is highly useful in the preparation of foam, or cellular products, and the latex is obtained from the emulsion by flashing to remove the unreacted monomer and some water; the resulting product is the latex. The solids content of the latex varies depending upon the particular synthetic elastomer involved and its ultimate utility. During the concentration by flashing off some water, the emulsifying agent is mainly left behind so that the quantity of the emulsifying agent contained in the latex is regulated by the amount that is contained in the reactor during the emulsion polymerization. The emulsification polymerization processes are regulated and controlled so that stable emulsions of rather high solids content are obtained so that a lesser amount of water will need to be flashed. Flashing is necessary, however, at least in order to remove unreacted monomer.

In recent years, synthetic elastomers produced by solution polymerization methods have received much attention mainly due to advances and changes in technology. The problems of emulsifying and concentrating the emulsion to produce latices has created difficulties not heretofore experienced because material differences exist not only because the elastomers are different but also because the solutions of these elastomers have very different rheological properties and characteristics. This will become more apparent as this description continues.

It is an object of this invention to provide improved processes for the preparation of concentrated latices. More particularly it is an object of this invention to produce concentrated latices of synthetic elastomers from organic solutions thereof. It is yet another object of this invention to produce such latices by processes which are rapid, efficient and economical. Other objects will become apparent as the description of this invention proceeds.

A particular object is a dispersing accompanied by or substantially consisting in a concentration of an aqueous dispersion of the macromolecular substance, without the necessity of applying the customary creaming agents, evaporation of water, or treatment in a centrifuge at a high speed of rotation. Insofar as the dispersing is to be performed by emulsification of a solution of the macromolecular substance, followed by removal of the solvent, an additional object is that there shall be no objectionable foam formation during such removal.

Now, in accordance with the invention, a process for the preparation of latices of elastomers is provided comprising the steps of (a) forming an emulsion of a rubber cement and water, using a relatively low concentration of emulsifier; (b) stripping organic solvent from the emulsion to form a stable dilute latex; (c) drastically increasing the emulsifier content, which surprisingly, destabilized the latex, and (d) separating a concentrated stable latex phase having a sharply reduced emulsifier content from a serum phase containing most of the emulsifier.

The process according to the invention may be further described as a process for the preparation of concentrated dispersions of one or more macromolecular substances in water with the aid of one or more water-soluble emulsifiers, the characteristic feature being that in the absence of a solvent for the macromolecular substances, an unstable dispersion of these substances in water is prepared by bringing the concentration of water-soluble emulsifiers, calculated on macromolecular substance, to a value sufficiently high to ensure that if this dispersion were left to itself, within 24 hours spontaneous segregation would take place therein of a top layer to be more fully defined, and that spontaneous segregation is subsequently allowed to occur or segregation is caused to take place in the unstable dispersion.

The segregated or segregating top layer must consist of a dispersion containing at least 50% by weight of the total quantity of macromolecular substances and in which the concentration of such substances is at least 10% w. and, in addition, is at least 1.2 times as large as in the unstable dispersion before segregation.

The range of emulsifier concentrations at which the spontaneous segregation described hereinbefore would occur can in each case easily be determined in advance experimentally.

When latices that contain relatively little macromolecular substance are concentrated, the concentration of water-soluble emulsifiers is preferably raised to a sufficiently high value to ensure that the top layer contains at least 90% w. of the total amount of macromolecular substances and/or that the concentration of such substances in that layer is at least twice as great as in the unstable dispersion before segregation.

In most cases the concentration, calculated on macromolecular substance of water-soluble emulsifiers at which the segregation aimed at according to the invention takes place, must be at least 20% w. and preferably from 25 to 100% w.

By water-soluble emulsifiers are understood emulsifiers of which a quantity of at least 50% by weight is soluble molecularly or micellary in the amount of water phase used under the conditions applied in the process.

After the segregation is completed or substantially completed, by far the greater part of the water-soluble emulsifiers is in the bottom layer, the top layer containing a comparatively low proportion of emulsifier.

The new process can be applied both at normal room temperatures and at lower or higher temperatures. In certain cases it may be advisable to choose temperatures from 25 to 80° C.

If the object is the preparation of highly concentrated latices, for instance dispersions having a content of 60–70% w. of macromolecular substance, it is desirable to promote the segregation, preferably by the use of a centrifuge with low or normal speed, or a hydrocyclone. The time required for segregation may, however, also be reduced by other means, for instance by the application of an electric field of force or by inducing vibrations.

The invention is of particular importance for the manufacture of concentrated suspensions or emulsions from aqueous dispersion of having lower concentrations, which display no spontaneous segregation of a top layer as referred to above within 24 hours. Preferably, these aqueous dispersions to be concentrated contain less than 15% w. of water-soluble emulsifiers calculated on macromolecular substance, and they may have been prepared in various ways.

Thus, the new process is particularly attractive for making concentrated artificial latices or emulsions, solutions (cements) of macromolecular substance in an organic solvent, being emulsified in water and the solvent subsequently removed. Care is then taken to ensure that as long as the solvent is still present, the concentration of water-soluble emulsifiers is so low that the spontaneous segregation described cannot take place and that excessive foaming does not occur during stripping. Again, as a rule this value, as referred to macromolecular substance, is preferably below 15% w. It is only after the removal of the solvent that the concentration of water-soluble emulsifiers is raised to a value at which the spontaneous segregation defined above would take place if the dispersion were left undisturbed.

Another very suitable embodiment of the process concerned is that in which the aqueous dispersions to be concentrated have been obtained by emulsion polymerization, in particular by emulsion polymerizations by which latices with relatively many coarse particles are obtained.

It is, however, also possible first intimately to mix the macromolecular substances, in the absence of a solvent and in the absence of water, with water-soluble emulsifiers and then to disperse the mixtures thus obtained in water. This procedure may, for instance, be very well applied if liquid macromolecular substances have to be dispersed. If the macromolecular substances are solid, mixing and dispersing will require more energy and more powerful apparatus and the dispersing in water will generally be effected after previously or simultaneously reducing the dimensions of the solid constituents. In this embodiment, which is therefore performed without any solvents for the macromolecular substances, the water-soluble emulsifiers or a portion of them may, if so desired, also be allowed to be formed in situ by mixing the liquid or solid macromolecular substances, together with or without the ready water-soluble emulsifiers, with emulsifier acids or emulsifier bases derived from these emulsifiers, and then to carry out the dispersing with water and sufficient alkali or acid to form the corresponding emulsifiers.

The intimate mixing can take place in any appropriate mixing or kneading apparatus, for instance on mills, in extruders, in Banbury mixers, in turbo mixers or in colloid mills. The reduction in size of the solid components may for example also be effected with the machines just mentioned. Other devices in which or by which a disintegrating effect can be brought about may, however, be similarly used for this reducing process.

The process according to the invention, can, if desired, also be carried out in such a manner that after the segregation an extra quantity of water-soluble emulsifiers is added once or several times to the mixture. The concentration of macromolecular substance in the top layer may thus, for instance, be increased stepwise and in this manner dispersions of various concentrations or fractions of differing concentration and particle size may be prepared. It is also possible further to concentrate a top layer segregated in accordance with the new process after it has been isolated from the bottom layer by adding an extra quantity of water-soluble emulsifiers.

THE SYNTHETIC ELASTOMER

The processes of this invention are applied to any synthetic elastomer that is in the form of a hydrocarbon solution before emulsification begins, and it is immaterial how the hydrocarbon solution of the synthetic elastomer is obtained. In the more preferred embodiments, the processes of this invention are applied to synthetic elastomers prepared by solution polymerization methods wherein an organic diluent is used as a combined solvent and diluent. Butadiene and isoprene are representative of dienes that are polymerized by solution polymerizations using the so-called "low pressure" polymerization methods wherein the polymerization catalyst may be the reaction product of a halide of a transition metal within Groups IV–VIII of the Periodic Table and a reducing agent such as an aluminum alkyl, aluminum alkyl halide, aluminum hydride, and the like. Lithium alkyls alone or in combination with lithium metal are also suitable polymerization catalysts for dienes. Thus, polybutadiene having a cis 1,4-content as high as about 98% may be obtained as well as polybutadiene having an essentially all trans 1,4-content. Polyisoprene which is essentially free of gel and free of branching may also be obtained with these low pressure catalysts by means known to the art. Another class of synthetic elastomers are the copolymers prepared from ethylene and one other monoolefin having up to 8 carbon atoms such as the elastomeric copolymer of ethylene and propylene, the copolymer of ethylene and butene-1, and the like. Elastomeric terpolymers prepared by solution polymerizations are also equally suitable for the purposes of the present invention and one such terpolymer is that obtained from ethylene, propylene, and a diene such as 1,5-hexadiene, prepared by polymerizing a mixture of monomers with a catalyst that may be the reaction product of a reducing agent of the kind indicated above and a vanadium compound such as vanadium halides, vanadium oxyhalides, vanadium esters, and the like. In all these cases, the diluent is a solvent such as pentane, hexane, amylene, benzene, halogenated derivatives thereof, and the like.

Persons skilled in the art will immediately recognize that these elastomers comprise those that are of relatively recent origin. These elastomer solutions are further characterized by very high viscosity although the elastomer content is relatively low. Thus, the solids content of the elastomer solution at the end of the polymerization rarely exceeds 25% by weight, and in fact at such concentrations difficult material handling problems are presented so that the solutions usually contain in the order of 5 to less than 25% by weight of elastomer. When the elastomer solution is emulsified, the solids content is substantially less, and it is because of the low solids content that concentration by prior art methods, i.e., flashing of water, becomes wholly unsuitable. The invention, however, is not critically limited to elastomers prepared by the "low pressure" processes and any elastomer produced by solution polymerizations may also be the subject of the present invention, and polyisobutylene is representative of one such elastomer. Alternatively, elastomers that are in solid form may be dissolved or redissolved after preparation by other means. When used within this specification, the term "synthetic elastomer" makes reference to synthetic elastomers defined according to ASTM Special Technical Publication No. 184, page 138, wherein the elastomer is further characterized as being essentially completely soluble in an organic solvent. In any case, the preparation of the synthetic elastomers form no part of this invention.

The present process is preferably applied for preparing concentrated dispersions of rubber-like materials, such as natural rubber or synthetic rubbers, for instance polyisobutene, styrene-butadiene copolymers, butadiene-acrylonitrile copolymers, polybutadiene and, in particular, polyisoprene and copolymers of ethene with propene and/or butene, in which copolymers also a non-conjugated diene, such as dicyclopentadiene, may have been copolymerized; furthermore, liquid polydienes or liquid diene copolymers are also suitable.

The process according to the invention may also be very well applied for preparing concentrated dispersions of non-rubberlike macromolecular substances, such as polystyrene, styrene-butadiene copolymers, in which the styrene content predominates ("high-styrene resins"), polyvinyl chloride and polymers and copolymers of vinyl esters or straight or branched monocarboxylic acids.

THE EMULSIFICATION

If the new process is used for the above-mentioned preparation of artificial latices from solutions of macro-substances emulsified in water, either water dispersible emulsifier or emulsifiers of the oil-dispersible type may be used for the emulsification. It may be advisable that for this emulsification are also present one or more emulsifier acids or one or more emulsifier bases derived from water-dispersible emulsifiers and that, after removal of the solvent, such emulsifier acids are converted by reaction with alkali, or such emulsifier bases are converted by reaction with acid, entirely or partially into the corresponding emulsifiers. Naturally, such quantities of emulsifier-forming components will be chosen as to correspond to the minimum concentration of water-dispersible emulsifiers that would cause spontaneous segregation of the top layer defined hereinbefore within 24 hours.

A variant to this in-situ formation of the water-dispersible emulsifiers is a similar procedure in which, conversely, emulsification is first effected in the presence of free alkali, for instance NaOH, or free acid, for instance HCl, and such alkali or acid is allowed to react, after removal of the solvent, with emulsifier acid or emulsifier base, respectively.

If, when preparing artificial latices from emulsified solutions, no in-situ formation of the water-dispersible emulsifiers is applied, the bottom layer, after it has been separated from the segregated top layer, is preferably mixed with a fresh quantity of the solvent-free dispersion to be concentrated. Prior to this mixing, the bottom layer with the high content of emulsifier may, if desired, first be concentrated. Similarly, when concentrating other aqueous solvent-free dispersions, which exhibit no spontaneous segregation of a top layer as described hereinbefore within 24 hours, the bottom layer may be used again.

Insofar as the new process is applied for preparing artificial latices from solutions of macromolecular substances, the solvent can be removed in the usual manner, for instance by vacuum and/or film evaporation or by steam-stripping. Because the emulsifier concentration is still low, there is at this stage little or no risk of objectionable foam formation. If foam formation should still cause trouble, this can be obviated by simple means, if desired, by blowing a gas, for instance air, in countercurrent through the foam.

The new process can very well be carried out as a continuous process.

Suitable water-dispersible emulsifiers are, in particular, the ionic emulsifiers. Obviously, the emulsifiers formed in situ already belong to this category. Preferably, anionic representatives are applied, such as alkali or ammonium soaps of resin acids and/or fatty acids, for instance of oleic acid, palmitic acid, stearic acid, lauric acid, myristic acid, ricinic acid. Other suitable anionic emulsifiers are the alkali or ammonium soaps of branched carboxylic acids, of alkyl or arylsulfuric acids, or alkyl or arylsulfonic acids, as well as of sulfated or sulfonated glycidyl esters of carboxylic acids. The cationic emulsifiers are also very suitable. To these belong, for instance, the amine salts, such as hydroxylamines of fatty esters with long chains, quaternary ammonium salts, such as tridecylbenzenehydroxyethylimidazolinium chloride, stearyldimethylbenzylammonium chloride, cetylpyridinium bromide, and so on. It is, however, also possible to use non-ionic water-soluble emulsifiers, for instance the phosphoric esters of higher alcohols, such as capryl and octyl alcohol, and also monoesters of oleic acid and pentaerythritol, sorbitan monooleate, etc.

THE DILUTE LATEX

The dilute latex is the resulting product after the organic diluent has been separated from the aqueous emulsion. Separation is suitably accomplished by stripping at elevated temperatures and preferably at reduced pressures. It will be appreciated that the solvent and elastomer, prior to stripping, are in a single phase in the form of a solution. Stripping the solvent from the emulsion has the effect of reducing the size of the swollen rubber particles until all the solvent is evaporated. The residue from the vaporization is water, soap and elastomer which may or may not contain solvent depending upon the extent to which stripping has taken place. Any residual monomer or monomer that remains unpolymerized will also be removed during the stripping and the amount of monomer will vary depending on the species involved, whether batch or continuous processes are used and similar considerations. For example, unreacted monomers from the preparation of elastomeric ethylene-propylene copolymer likely would be vented prior to stripping so that the elastomer solution would contain very little monomer. On the other hand, where the monomers have higher boiling points, the elastomer solution may contain as much as 50% of the original monomer, and maybe even more. There very likely will be some foaming during stripping and the foam may be handled by any conventional procedure except that the use of anti-foaming agents is not usually recommended, particularly if the resulting latex is to be used in the preparation of foam products. One method of handling the foam is to permit it to be carried over with the evaporating solvent after which the foam is contacted with a cold surface which causes it to collapse. By this method foam breaking is accomplished by condensation of the organic phase. The resulting dilute latex and solvent may then be separated by a settling process and the recovered organic solvent is removed.

The major advantage of utilizing the process of the present invention is not only the preparation of a highly concentrated latex, by a simple procedure, but also one which avoids any massive foaming which normally occurs when a relatively high proportion of emulsifier is present. The process is preferably that in which stripping of the dilute emulsion of organic solvent is carried out below the temperature and pressure at which any appreciable amounts of water volatilize and one in which the emulsion contains 3–15% by weight of elastomer, less than about 15 phr. (parts per hundred parts rubber by weight) of an aqueous dispersible emulsifier, 500–3,500 phr. organic solvents for the elastomer and 350–3,500 phr. of water.

Removal of solvents under these conditions is effected easily with a minimum of foaming, if any. Thereafter, the next essential step in the process comprises the addition of a massive amount of emulsifying agents sufficient to increase the total emulsifier content of the dilute stable latex formed by the stripping operation to between 20 and 100 phr. Surprisingly, this forms an unstable system which tends to separate into two major phases. The top comprises a highly concentrated latex containing substantially all of the elastomer and only a minor proportion of the total emulsifier and a lower phase referred to as "serum" comprising no more than minor proportions of elastomer and substantially all of the remaining emulsifier. These two phases are then separated either by gravity or by centrifuging, the latter acting to expedite the step and to obtain a more highly concentrated latex. Under these conditions, the resulting stable concentrated latex contains at least about 90% by weight of the total elastomer and only about 1–5 phr. of emulsifier, while the serum phase contains less than about 10% of the total elatsomer and substantially all of the remaining emulsifier. The elastomer content of the stable concentrated latex then comprises at least about 35% by weight based on the concentrated latex.

The invention is elucidated by the following examples.

Example I

From a styrene-butadiene copolymer containing 23.5% w. of combined styrene and having an intrinsic viscosity of 2.2, a Mooney viscosity (M.L. 4) of 50 and a Hoekstra plasticity of 35, an artificial latex was prepared by emulsifying with the aid of a turbo mixer 100 parts by volume of a 7.5% w./v. solution of the copolymer in cyclohexane with 100 parts by vol. of water, a quantity of potassium oleate being present corresponding to 10 parts by weight per 100 parts by weight of copolymer.

Thereafter, from the emulsion thus obtained, the cyclohexane was removed by treatment with superheated steam. This treatment was carried out in a steam stripper; some foam was formed, which was easily broken up by blowing in cold air. To the solvent-free latex, which contained 7.5% w./v. of copolymer and 0.75% w./v. of potassium oleate, was now added a solution of 23.3 parts by weight of potassium oleate per 100 parts by weight of copolymer in sufficient water to make the total volume of the resultant mixture 20 parts by volume.

A quantity of 100 parts by vol. of the unstable suspension obtained, which contained 3.75% w./v. of copolymer and 1.25% w./v. of potassium oleate, was left undisturbed at room temperature. A top layer separated, of which the polymer concentration increased gradually. After 20 hours the segregated top layer consisted of 8.5 parts by volume of latex, which contained 44% w./v. of copolymer and only 1.25% w./v. of potassium oleate. The remainder of the amount of soap applied was in the serum layer of 91.5 parts by vol. This layer no longer contained any particles of copolymer, as was apparent from the fact that when ethanol or acetone was added no precipitate was formed.

Example II

The experiment described in Example I was repeated, but with the differences that the solvent applied was benzene, emulsification was effected in a colloid mill with the aid of 6.7 parts by weight of potassium oleate per 100 parts by weight of copolymer, and the soap solution that was added to the latex from which the solvent had been removed contained 60 parts by weight of potassium oleate per 100 parts of copolymer.

After admixture of the solution of the extra amount of soap to the benzene-free latex, the resultant mixture contained 3.75% w./v. of copolymer and 2.5% w./v. of potassium oleate.

In the 100 parts by volume of the unstable suspension that had been left at room temperature, after 20 hours a top layer had been formed of 5 parts by volume of a concentrated latex, which contained 75% w./v. of copolymer and 2.5% w./v. of potassium oleate. The 95 parts by volume of bottom layer with a high soap content again contained no copolymer.

Example III

A solution of 10 parts by weight of an ethene-propene-dicyclopentadiene terpolymer in 100 parts by volume of n-hexane was emulsified in a colloid mill with the aid of 50 parts by volume of water containing 0.75 part by weight of potassium oleate. The terpolymer contained 58.5% w. of ethene, 39% w. of propene and 2.5% w. of dicyclopentadiene, while the number of double bonds per 1000 carbon atoms was 4.3, the intrinsic viscosity 1.6, the Hoekstra plasticity 38 and the Mooney viscosity (M.L. 4) 51. From the emulsion obtained the hexane was stripped with steam, after which were obtained 143 parts by volume of a latex containing 7% w./v. of terpolymer and 0.5% w./v. of potassium oleate. Thus, latex, was divided into three portions of equal parts by volume, after which the quantities of potassium oleate recorded in the table were added to each of these portions.

After these had been kept for 20 hours at room temperature, a top layer had separated on each latex portion while none of the serum layers contained any terpolymer. The terpolymer concentrations of the top layers are also given in the table.

TABLE

|  | Portion I | Portion II | Portion III |
|---|---|---|---|
| Extra quantity of potassium oleate added, parts by weight per 100 parts of terpolymer | 20 | 40 | 80 |
| Terpolymer concentration of top layer at the end of 20 hours, % w./v. | 40 | 45 | 60 |

Example IV

An artificial latex was made by emulsifying in a colloid mill: 100 parts by volume of a 10% w./v. solution of polyisoprene (intrinsic viscosity=2.0; 94% cis-structure) in n-hexane, to which had been added 3.97 parts by weight of oleic acid and 100 parts by volume of water in which was dissolved 0.5 part by weight of potassium oleate.

After removal of the hexane by stripping with superheated steam 0.76 part by weight of KOH dissolved in sufficient water to make the total volume of the latex solution 200 parts by volume was added to the solvent-free latex. This latex, whose polyisoprene concentration was 5% w./v. and the potassium oleate concentration 2.5% w./v. was left to segregate spontaneously at room temperature. At the end of 20 hours a top layer of 16 parts by volume had separated, of which the polyisoprene concentration was 62% w./v.

Example V 100 parts by weight of the styrene-butadiene copolymer described in Example I were mixed on a two-roll rubber mill with 100 parts by weight of oleic acid. The milled sheet obtained was cut into pieces having an area of about 0.25 cm.$^2$, after which the pieces were put into a solution of 16 g. of NaOH in 500 ml. of water. From this mixture a dispersion was prepared at 90° C with the aid of a colloid mill, in the intake funnel of which was placed a high-speed turbo mixer. In the latex obtained a stable top layer, which contained all the copolymer in a concentration of 55% w., separated within 24 hours.

Example VI

An artificial latex of polybutadiene (intrinsic viscosity 2.0 98% cis-structure) was prepared by emulsifying, with the aid of a turbo mixer, 100 parts by volume of a 10% w./v. solution of the polymer in n-hexane and 100 parts by volume of water in which 1.5 parts by weight of cetyltrimethylammonium bromide had been dissolved.

After stripping the n-hexane with superheated steam another 1.5 parts by weight of the ammonium bromide was added to the latex obtained, after which the resultant unstable suspension was left at room temperature. After 20 hours a top layer had separated, consisting of polybutadiene latex of which the polymer concentration was 40% w./v.

Concentration could be accelerated by centrifuging the hexane-free unstable suspension, obtained after extra addition of 1.5 parts by weight of the above bromide in a continuously operating super-centrifuge at low speed (2000-3000 revolutions per minute). Under these conditions a 70% w. polybutadiene latex was separated in as little as half an hour.

We claim as our invention:
1. The process for producing a concentrated latex free of creaming agents comprising
   (a) stripping an aqueous elastomeric emulsion of essentially all organic solvent at temperatures below the boiling point of water under the pressure conditions present;
   (b) said emulsion containing 3 to 15% by weight of synthetic elastomer, less than 15 phr. of an aqueous dispersible carboxylic acid soap emulsifier, 500 to 3500 phr. of organic solvent for the elastomer selected from the group consisting of hydrocarbon solvents and halogen derivatives thereof and 350 to 3500 phr. water; whereby a stable dilute latex is formed;

(c) adding thereto an amount of carboxylic acid soap emulsifying agent sufficient to increase the total emulsifier content to between 20 and 100 phr., whereby an unstable latex is formed;

(d) and phase separating therefrom as a first phase free of creaming agents a stable concentrated latex containing at least about 90% by weight of the total elastomer and 1 to 5 phr. emulsifier and as a second phase an aqueous serum containing less than 10% by weight of the total elastomer and substantially all of the remaining emulsifier;

(e) said concentrated latex having an elastomer content of at least about 35% by weight based on the total concentrated latex;

(f) wherein phr. has the meaning parts per hundred parts elastomer by weight.

2. A process according to claim 1 wherein the emulsifier is a higher fatty acid soap.

3. A process according to claim 1 wherein phase separation in step (d) is by means of centrifuging.

4. A process according to claim 1 wherein the serum separated in step (d) is recycled for use in step (c).

5. A process according to claim 1 wherein the elastomer is a styrene-butadiene copolymer.

6. A process according to claim 1 wherein the elastomer is polyisoprene.

7. A process according to claim 1 wherein the elastomer is polybutadiene.

References Cited by the Examiner
UNITED STATES PATENTS 2,799,662 7/1957 Ernst et al. _____ 260—29.7
2,953,556 9/1960 Wolfe et al. _____ 260—29.7

MURRAY TILLMAN, *Primary Examiner.*

L. P. QUAST, *Examiner.*

J. ZIEGLER, *Assistant Examiner.*